US011134707B2

(12) United States Patent
Li et al.

(10) Patent No.: US 11,134,707 B2
(45) Date of Patent: Oct. 5, 2021

(54) NANOSTRUCTURED IRON/CARBON FOR SCAVENGING OXYGEN

(71) Applicants: AGENCY FOR SCIENCE, TECHNOLOGY AND RESEARCH, Singapore (SG); National University of Singapore, Singapore (SG)

(72) Inventors: Xu Li, Singapore (SG); Yu Yuan Chieng, Singapore (SG); Siew Yee Wong, Singapore (SG); Suxi Wang, Singapore (SG); Jen-Yi Huang, Singapore (SG); Weibiao Zhou, Singapore (SG)

(73) Assignees: AGENCY FOR SCIENCE, TECHNOLOGY AND RESEARCH, Singapore (SG); NATIONAL UNIVERSITY OF SINGAPORE, Singapore (SG)

( * ) Notice: Subject to any disclaimer, the term of this patent is extended or adjusted under 35 U.S.C. 154(b) by 70 days.

(21) Appl. No.: 15/576,696

(22) PCT Filed: May 23, 2016

(86) PCT No.: PCT/SG2016/050245
§ 371 (c)(1),
(2) Date: Nov. 22, 2017

(87) PCT Pub. No.: WO2016/190815
PCT Pub. Date: Dec. 1, 2016

(65) Prior Publication Data
US 2018/0132509 A1    May 17, 2018

(30) Foreign Application Priority Data

May 22, 2015    (SG) .......................... 10201504050U

(51) Int. Cl.
| B01J 20/20 | (2006.01) |
| A23L 3/3436 | (2006.01) |
| A23B 7/148 | (2006.01) |
| B01J 20/02 | (2006.01) |
| B01J 20/28 | (2006.01) |
| B01J 20/30 | (2006.01) |
| B01J 20/32 | (2006.01) |
| B65D 81/26 | (2006.01) |

(52) U.S. Cl.
CPC ............ *A23L 3/3436* (2013.01); *A23B 7/148* (2013.01); *B01J 20/0229* (2013.01); *B01J 20/20* (2013.01); *B01J 20/28059* (2013.01); *B01J 20/28061* (2013.01); *B01J 20/28064* (2013.01); *B01J 20/28066* (2013.01); *B01J 20/28083* (2013.01); *B01J 20/28085* (2013.01); *B01J 20/3085* (2013.01); *B01J 20/3204* (2013.01); *B01J 20/3236* (2013.01); *A23V 2002/00* (2013.01); *B65D 81/266* (2013.01)

(58) Field of Classification Search
CPC ......... B01J 20/20; B01J 20/223; B01J 20/324
See application file for complete search history.

(56) References Cited

U.S. PATENT DOCUMENTS

| 4,201,831 | A | * | 5/1980 | Slusarczuk | ............... B01J 20/20 210/679 |
| 4,769,175 | A | | 9/1988 | Inoue | |
| 4,970,189 | A | * | 11/1990 | Tachibana | ............. C04B 35/528 502/182 |
| 6,508,955 | B1 | | 1/2003 | DelDuca et al. | |
| 6,926,846 | B1 | | 8/2005 | DelDuca et al. | |
| 7,718,570 | B2 | * | 5/2010 | Pak | .......................... B01J 20/20 423/445 R |
| 7,998,898 | B2 | * | 8/2011 | Gadkaree | .................. B01J 20/20 502/417 |
| 8,999,308 | B2 | | 4/2015 | Mateu et al. | |
| 9,718,045 | B2 | * | 8/2017 | Tour | ........................ B01D 53/62 |

(Continued)

FOREIGN PATENT DOCUMENTS

| CN | 102424920 A | 4/2012 |
| JP | H026308 A | 1/1990 |

(Continued)

OTHER PUBLICATIONS

PCT International Search Report for PCT Counterpart Application No. PCT/SG2016/050245, 6 pgs. (dated Jun. 27, 2016).
PCT Written Opinion for PCT Counterpart Application No. PCT/SG2016/050204, 8 pgs. (dated Jun. 27, 2016).
Hoekstra, J., et al., "Carbon-Supported Base Metal Nanoparticles: Cellulose at Work," ChemSusChem, vol. 8, No. 6, pp. 985-989 (Feb. 20, 2015).
Notice of Reasons for Refusal dated May 27, 2020 for Japanese patent application No. 2017-560586.
Written Opinion of the International Searching Authority dated Jun. 27, 2016 for related PCT application PCT/SG2016/050245.
International Preliminary Report on Patentability dated Nov. 28, 2017 for related PCT application PCT/SG2016/050245.

*Primary Examiner* — Stuart L Hendrickson
(74) *Attorney, Agent, or Firm* — Womble Bond Dickinson (US) LLP

(57) ABSTRACT

The invention is directed to a nanostructured composite material comprising a mixture of at least one metal particle such as iron and a carbon material from biomass such as D-glucose, D-glucosamine hydrochloride or a-cyclodextrin. The invention is also directed to a composition comprising the composite material comprising the composite material and an inorganic salt, and a method for synthesizing the composite material comprising immersing the carbon material into a solution of metal ions, drying the impregnated carbon particle and subjecting the impregnated carbon particle to a carbothermal reduction process. The nanostructured composite material is useful as an oxygen scavenging layer in a multi-layer film which comprises the oxygen scavenging layer and an oxygen barrier layer that retards the permeation of oxygen from an external environment.

4 Claims, 5 Drawing Sheets

(56) References Cited

U.S. PATENT DOCUMENTS

| | | | |
|---|---|---|---|
| 10,011,503 B2* | 7/2018 | Addiego | ............ B01D 15/265 |
| 2009/0061062 A1 | 3/2009 | Beckwith et al. | |
| 2011/0017611 A1 | 1/2011 | Menozzi et al. | |
| 2011/0278499 A1 | 11/2011 | McKedy et al. | |
| 2011/0281125 A1 | 11/2011 | Chau et al. | |
| 2014/0004232 A1 | 1/2014 | Foltynowicz et al. | |

FOREIGN PATENT DOCUMENTS

| | | |
|---|---|---|
| JP | H07-254412 A | 10/1995 |
| JP | 2007-000724 A | 1/2007 |
| JP | 2013-173623 A | 9/2013 |
| JP | 5520414 B1 | 6/2014 |
| JP | 2015-168219 A | 9/2015 |
| JP | 2016-515143 A | 5/2016 |
| WO | WO03/106333 A1 | 12/2003 |
| WO | WO 2011/090279 A2 | 7/2011 |

* cited by examiner

[Fig. 1]
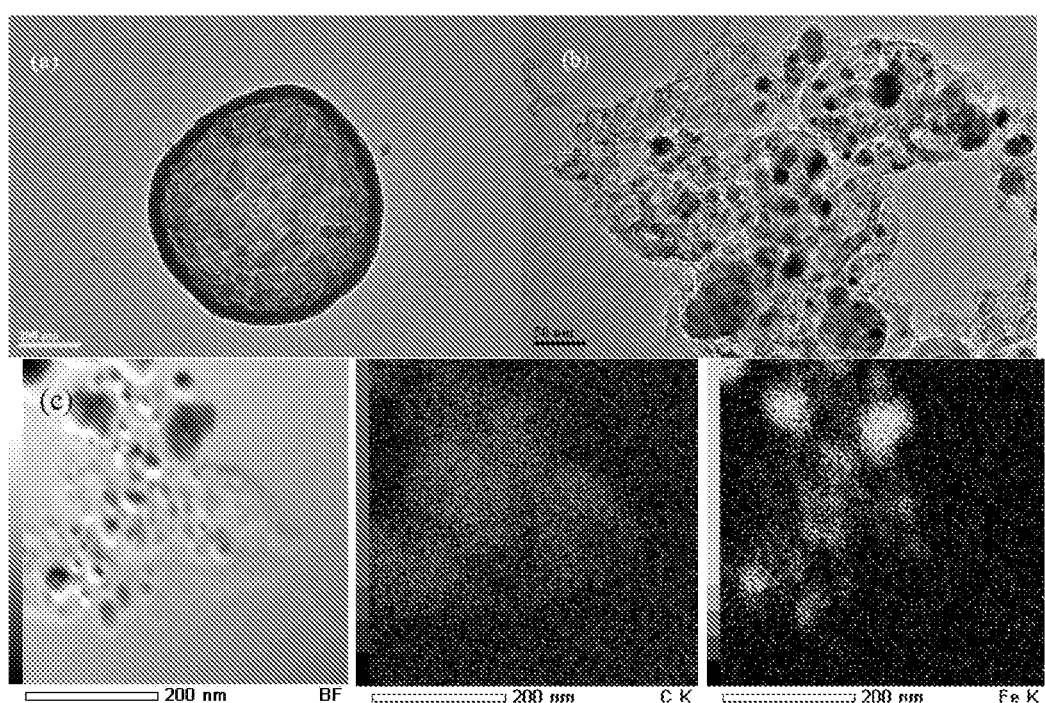

[Fig. 2]
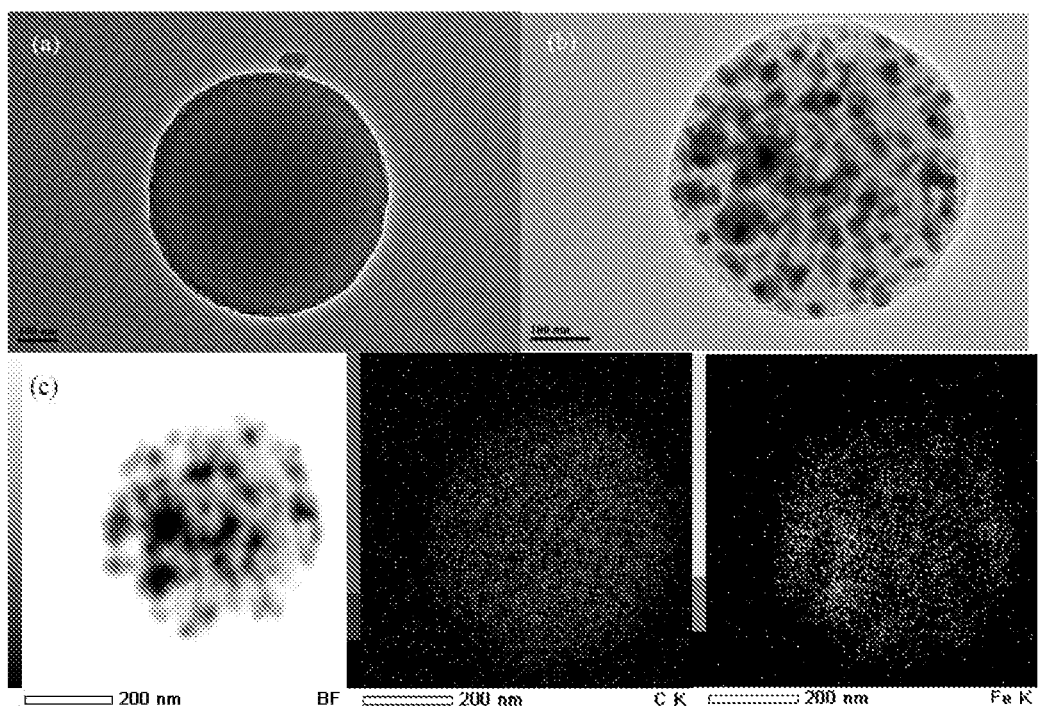

[Fig. 3]
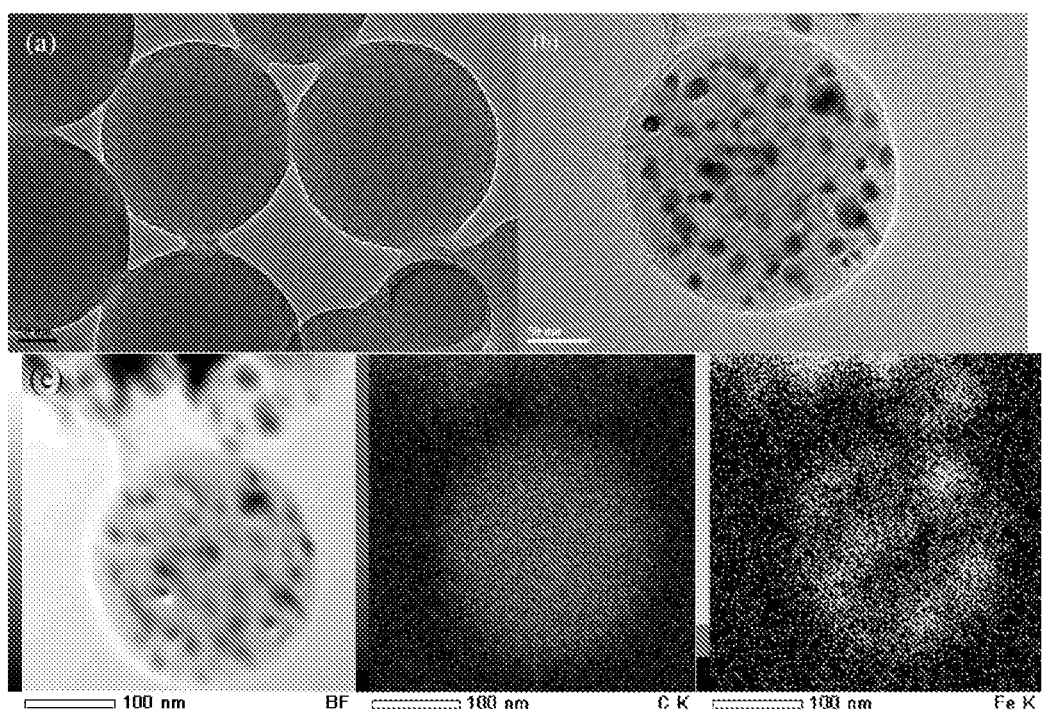

[Fig. 4]
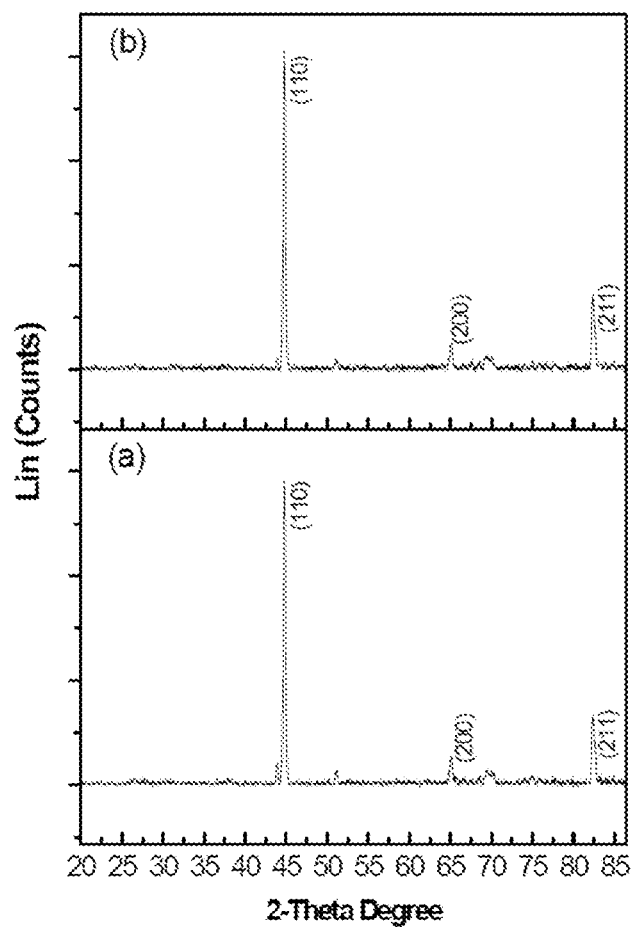

[Fig. 5]
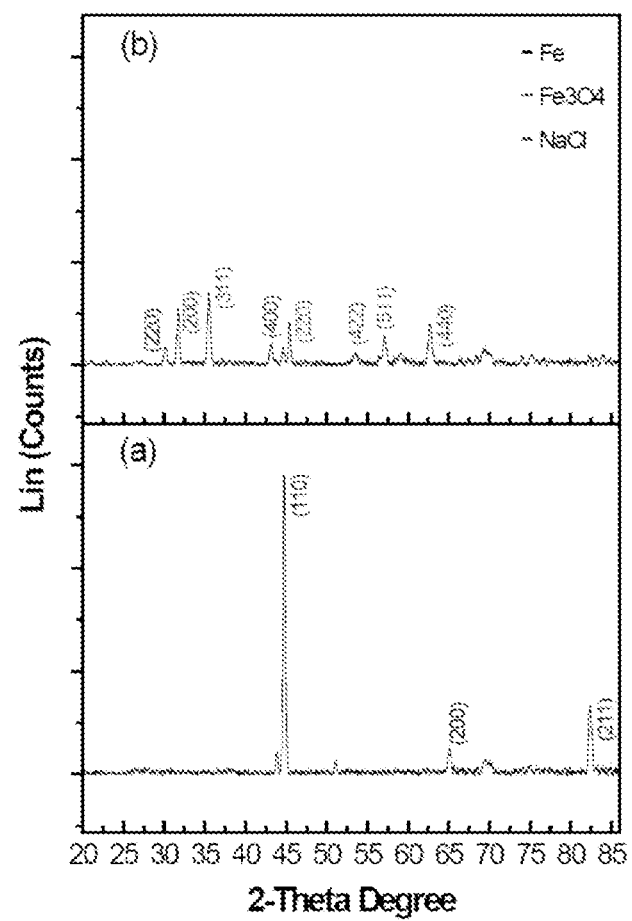

NANOSTRUCTURED IRON/CARBON FOR SCAVENGING OXYGEN

CROSS-REFERENCE TO RELATED APPLICATIONS

This patent application is a U.S. National Phase Application under 35 U.S.C. § 371 of International Application No. PCT/SG2016/050245, filed on 23 May 2016, entitled NANOSTRUCTURED IRON/CARBON FOR SCAVENGING OXYGEN, which claims the benefit of priority of Singapore patent application No. 10201504050U, filed 22 May 2015.

TECHNICAL FIELD

The present invention generally relates to a composite material. The present invention also relates to a composition comprising the composite material, a method of synthesizing the composite material and to uses thereof.

BACKGROUND ART

The presence of oxygen in packaging is a key factor limiting the quality of products packaged. Many foods especially perishable foods such as fruits and vegetables are very sensitive to oxygen. Food deterioration as a result of oxygen being present in the packaging may cause oxidative rancidity of fats and oils, loss of vitamin C, discoloration and growth of microorganisms. One of the main purposes of food packaging is to protect the food packaged against oxygen, thus reducing quality changes and prolonging the shelf life. Many efforts have been done to provide a packaging with good barrier property against permeation of oxygen. Modified atmosphere and vacuum packaging are known methods to remove as much oxygen as possible in the package prior to sealing of the packaging. However, these technologies are unable to completely remove the oxygen from the packaging or completely retard the oxygen from penetrating into the packaging. Moreover, high cost and complicated operations are some issues related to modified atmosphere and vacuum packaging. Herein, the development of an effective oxygen absorbent is highly desired to eliminate the oxygen residues (oxygen dissolved in the food or present in the headspace) in the packaging.

Oxygen absorbents or oxygen scavengers are becoming increasingly attractive in food packaging to protect products from the detrimental effects of oxygen exposure. In general, oxygen absorbing technology is based on the oxidation process. Oxygen scavengers may be selected from one or more of iron powder, ascorbic acid, enzymes, unsaturated hydrocarbon, photosensitive polymers and etc. Organic and unsaturated hydrocarbon scavengers are relatively unstable and may lead to unpleasant odour as a by-product after the oxidation process. Among these oxygen scavengers, iron based oxygen scavenger is the most well-known and commercially available product due to several reasons including high scavenging efficiency, low cost and safety. The efficiency of iron based oxygen scavenger is dependent on the absorption capacity ($cm^3$ of $O_2$ absorbed/gram of iron) and absorption rate. It is postulated that a good dispersion (homogeneity) of iron particles on a carrier or support without agglomeration will enhance its absorption capacity. In addition, stable iron nano-size particles and high surface areas of support are important factors to produce an oxygen scavenger with superior absorption capacity performance.

However, there are several limitations to the current commercially available oxygen scavengers which include limited lifetime and stability of scavengers during storage at ambient conditions, high cost, complicated handling operations or preparations and potential health risks for selective materials. Therefore, there is a need to provide an alternative oxygen scavenger that overcomes or at least ameliorates one or more disadvantages as mentioned above.

SUMMARY OF INVENTION

According to a first aspect, there is provided a composite material comprising a mixture of at least one metal particle and a carbon material.

The carbon material may be derived from a biomass material. Advantageously, due to the use of biomass as a source for the carbon material, the resultant carbon material would have a layer of saccharides that is able to absorb the metal particles. This may lead to the carbon material having a high affinity to the metal particles. This may also lead to a uniform dispersion of the metal particles on or within the carbon material.

Advantageously, the composite material may be used as an oxygen scavenging material. The composite material, when used as an oxygen scavenging material, may be safe (that is, non toxic to the packaging material), may have a longer lifetime as compared to conventional oxygen scavengers, may have good stability during storage at ambient conditions, may be of low cost and easier to prepare or operate.

According to another aspect, there is provided a composition comprising a composite material comprising a mixture of at least one metal particle and a carbon material, an inorganic salt and optionally an aqueous medium.

According to another aspect, there is provided a method of synthesizing a composite material comprising a mixture of at least one metal particle and a carbon material, comprising the steps of:
  i. immersing at least one carbon particle that has a porous structure into a solution of metal ions to allow said metal ions to impregnate into the pores of the carbon particle;
  ii. drying the impregnated carbon particle; and
  iii. subjecting the impregnated carbon particle to a carbothermal reduction process at conditions to thereby synthesize the composite material.

According to another aspect, there is provided a multi-layer film comprising an oxygen barrier layer that retards the permeation of oxygen from an external environment into the multilayer film and an oxygen scavenging layer comprising a composite material having a mixture of at least one metal particle and a carbon material.

Definitions

The following words and terms used herein shall have the meaning indicated:

The term 'biomass material' is to be interpreted broadly to include biological material derived from living, or living organisms. This is often used to mean plant based material but can equally apply to both animal and vegetable derived material when biomass is used for energy. Herein, biomass is carbon based and is composed of a mixture of organic molecules containing hydrogen, usually including atoms of oxygen, often nitrogen, and also small quantities of other atoms, including alkali, alkaline earth and heavy metals.

The term "composite material" as used herein represents a material made from two or more constituent materials with significantly different physical or chemical properties that, when combined, produce the material. The individual components remain separate and distinct within the finished material.

The term "oxygen barrier" as used herein refers to some form of obstacle that guards against or prevents oxygen from a surrounding or external environment from entering into an interior to thereby avert oxidation process from taking place.

The term "oxygen scavenging" as used herein refers to an act of gathering or removing oxygen from an enclosed area or a mixture.

The term "multilayer film" as used herein refers to a coating or deposit consisting of several or many layers, each being formed of the same or different material.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF OPTIONAL EMBODIMENTS

Exemplary, non-limiting embodiments of a composite material will now be disclosed.

The composite material comprises a mixture of at least one metal particle and a carbon material.

In the composite material, the carbon material may be a carbon particle that was derived from biomass materials. The biomass material may be selected from the group consisting of a lignin, a saccharide, a fatty acid, a protein, and combinations thereof. It is to be noted that the type of biomass material is not particularly limited as long as it can undergo a carbothermal reaction to form carbon particles. As mentioned above, due to the use of biomass as a source for the carbon material, the resultant carbon material would have a layer of saccharide (such as monosaccharide, disaccharide, polysaccharide or oligosaccharide) that is able to absorb the metal particles. This may lead to the carbon material having a high affinity to the metal particles. Examples of biomass material are then provided in further details below.

Where the biomass material is a saccharide, the saccharide may be selected from a monosaccharide (such as glucose, fructose or galactose), a disaccharide (such as sucrose, lactose, maltose, trehalose or cellobiose), an oligosaccharide (such as sugar or an amino sugar) or a polysaccharide (such as a cyclodextrin, a cellulose, a starch, a glycogen, a chitin and a hemicellulose). Exemplary types of saccharides may include, but are not limited to α-cyclodextrin, β-cyclodextrin, γ-cyclodextrin, D-glucosamine hydrochloride, L-glucosamine hydrochloride, α-D-glucose, β-D-glucose, α-L-glucose or β-L-glucose.

Where the biomass material is a fatty acid, the fatty acid may be saturated, monounsaturated or polyunsaturated. The fatty acid may contain about 4 to about 28 carbon atoms. Exemplary fatty acids may include, but are not limited to, myristoleic acid, palmitoleic acid, sapienic acid, oleic acid, elaidic acid, vaccenic acid, linoleic acid, linolaidic acid, α-linolenic acid, arachidonic acid, eicosapentaenoic acid, erucic acid, docasahexaenoic acid, caprylic acid, capric acid, lauric acid, myristic acid, palmitic acid, stearic acid, arachidic acid, behenic acid, lignoceric acid, cerotic acid or butyric acid. Where appropriate, the fatty acid may include the trans- or cis-configuration of the relevant fatty acids.

Where the biomass material is a protein, the type of protein is not particularly limited and can include any biomolecule that has one or more long chains of amino acid residues.

Where the carbon material is a carbon particle, the carbon particle may be a spherical particle having a diameter in the range of about 100 nm to 1 μm, about 100 nm to about 200 nm, about 100 nm to about 300 nm, about 100 nm to about 400 nm, about 100 nm to about 500 nm, about 100 nm to about 600 nm, about 100 nm to about 700 nm, about 100 nm to about 800 nm, about 100 nm to about 900 nm, about 200 nm to about 1 μm, about 300 nm to about 1 μm, about 400 nm to about 1 μm, about 500 nm to about 1 μm, about 600 nm to about 1 μm, about 700 nm to about 1 μm, about 800 nm to about 1 μm or about 900 nm to about 1 μm. Where the carbon particle is an irregularly shaped particle, the above diameter may refer to the equivalent diameter of the irregularly shaped carbon particle. The carbon particle, depending on the size of the particle, may then be termed as a carbon microparticle or a carbon nanoparticle.

Alternatively, the carbon material may be a sheet-like material. The length/diameter ratio of the sheet material may be higher than 1, higher than 2, higher than 3 or higher than 5.

The carbon material may have a porous structure. The pore size of the porous carbon material may be in the range of about 10 nm to about 700 nm, about 10 nm to about 100 nm, about 10 nm to about 200 nm, about 10 nm to about 300 nm, about 10 nm to about 400 nm, about 10 nm to about 500 nm, about 10 nm to about 600 nm, about 100 nm to about 700 nm, about 200 nm to about 700 nm, about 300 nm to about 700 nm, about 400 nm to about 700 nm, about 500 nm to about 700 nm, or about 600 nm to about 700 nm.

The carbon material may have a surface area in the range of about 50 $m^2/g$ to about 1000 $m^2/g$, about 50 $m^2/g$ to about 100 $m^2/g$, about 50 $m^2/g$ to about 200 $m^2/g$, about 50 $m^2/g$ to about 300 $m^2/g$, about 50 $m^2/g$ to about 400 $m^2/g$, about 50 $m^2/g$ to about 500 $m^2/g$, about 50 $m^2/g$ to about 600 $m^2/g$, about 50 $m^2/g$ to about 700 $m^2/g$, about 50 $m^2/g$ to about 800 $m^2/g$, about 50 $m^2/g$ to about 900 $m^2/g$, about 100 $m^2/g$ to about 1000 $m^2/g$, about 200 $m^2/g$ to about 1000 $m^2/g$, about 300 $m^2/g$ to about 1000 $m^2/g$, about 400 $m^2/g$ to about 1000 $m^2/g$, about 500 $m^2/g$ to about 1000 $m^2/g$, about 600 $m^2/g$ to about 1000 $m^2/g$, about 700 $m^2/g$ to about 1000 $m^2/g$, about 800 $m^2/g$ to about 1000 $m^2/g$ or about 900 $m^2/g$ to about 1000 $m^2/g$.

The carbon material may act as a support for the metal particle. If the metal particle is smaller in size as compared to the pore size of the carbon material, the metal particle may be impregnated within the pores of the carbon material.

The carbon material may act as a protector for the metal particle. Where the metal particle is smaller than the carbon material, the metal particle may be embedded within the carbon material such that the metal particle can be envisaged as having a layer of carbon coating around the metal particle. This may then protect the metal particle from oxidation.

If the metal particle is bigger in size as compared to the carbon material, the metal particle and the carbon material may agglomerate together to form a cluster. It is also possible that a plurality of the smaller carbon material may group together and partially surround or completely surround the bigger metal particle.

The metal particle of the composite material may be a transition metal particle. The transition metal may be selected from Groups 7 to 9 of the Periodic Table of Elements. The transition metal particle may be selected from the group consisting of iron particles, ruthenium particles, osmium particles, cobalt particles, rhodium particles, iridium particles, manganese particles and combinations thereof. The metal particle may be zero-valent metal particle when deposited on the carbon material. The zero-valent metal particle may be uniformly or randomly distributed on the carbon material, whether on the surfaces of the carbon material or within the pores of the carbon material.

The metal particle may have a particle size of less than about 500 nm, less than about 200 nm, less than about 100 nm or less than about 50 nm.

The concentration of the metal particle in the composite material may be in the range of about 1 wt % to about 80 wt %, about 1 wt % to about 10 wt %, about 10 wt % to about 80 wt %, about 20 wt % to about 80 wt %, about 30 wt % to about 80 wt %, about 40 wt % to about 80 wt %, about 50 wt % to about 80 wt %, about 60 wt % to about 80 wt %, about 70 wt % to about 80 wt %, about 10 wt % to about 70 wt %, about 10 wt % to about 60 wt %, about 10 wt % to about 50 wt %, about 10 wt % to about 40 wt %, about 10 wt % to about 30 wt % or about 10 wt % to about 20 wt %, based on the dry weight % of the carbon material.

The composite material, due to the presence of the metal particle therein, may act as an oxygen scavenging material and be able to absorb oxygen in a packaging. The metal particles may not undergo oxidation when present in the composite material, even when exposed to ambient conditions for a long period of time. Due to the presence of the carbon material, the composite material may be stable and may last longer than conventional oxygen scavenging materials. Hence, the carbon material aids 1) to control the oxidation speed of the metal particle (such as nanosized iron) from oxidizing too fast and uncontrollably; and 2) to allow oxygen to diffuse into the surface of the metal particle to be oxidized. This may be due to the formation of a thin layer of porous carbon material that is believed to form on the surface of the metal particles during the carbothermal reduction process, which slows down the diffusion of oxygen to the metal particles.

The composite material may be used in food packaging. Where the metal particle is an iron particle, the composite material may exhibit good oxygen scavenging capacity with an absorption capacity of up to 210 $cm^3/g$ of iron.

The composite material may be made up a carbon material with one or more metal particles.

Exemplary, non-limiting embodiments of a composition will now be disclosed. The composition comprises a composite material comprising a mixture of at least one metal particle and a carbon material; an inorganic salt; and optionally an aqueous medium.

The composite material may be one that is defined above.

The inorganic salt may be an electrolyte or an acidifying agent. The inorganic salt may be used to activate or promote the oxygen scavenging ability of the composite material. The inorganic salt may be used as an accelerator to control the absorption rate of oxygen in the scavenging system.

The electrolyte may be a halide compound. The halide compound may be an alkali metal halide, an alkaline earth metal halide or a metal halide. The halide compound may be a chloride compound, an iodide compound, a fluoride compound or a bromide compound. The halide compound may be selected from the group consisting of sodium chloride, lithium chloride, calcium chloride, magnesium chloride, iron (III) chloride, iron (II) chloride, sodium iodide, lithium iodide, calcium iodide, magnesium iodide, iron (II) iodide, sodium fluoride, lithium fluoride, calcium fluoride, magnesium fluoride, sodium bromide, lithium bromide, calcium bromide, magnesium bromide, iron (III) bromide or iron (II) bromide.

The concentration of the inorganic salt may be in the range of about 0.1 wt % to about 20 wt %, about 0.1 wt % to about 20 wt %, about 0.1 wt % to about 20 wt %, about 0.1 wt % to about 20 wt %, about 0.1 wt % to about 20 wt %, about 0.1 wt % to about 20 wt %, about 0.1 wt % to about 20 wt %, about 0.1 wt % to about 20 wt %, about 0.1 wt % to about 20 wt %, about 0.1 wt % to about 20 wt %, about 0.1 wt % to about 20 wt %, about 0.1 wt % to about 20 wt %, based on the dry weight of the composite material.

The acidifying agent may be a polyacid. The polycarboxylic acid may be polyacrylic acid, polymethacrylic acid, polyethylacrylic acid, or polymaleic acid.

The use of an inorganic salt in the composition may decrease the concentration of oxygen in a package or container by at least about 30%, at least about 40%, at least about 50%, at least about 60%, at least about 70%, at least about 80%, at least about 90%, at least about 95%, or at least about 99% after 4 days.

The presence of trace amounts of an aqueous medium such as water may promote the oxygen scavenging ability of the composition. Where trace amounts of the aqueous medium is used, the concentration of oxygen in a package or container may be decreased by at least about 40%, at least about 50%, at least about 60%, at least about 70%, at least about 80%, at least about 90%, at least about 95% or at least about 99%, after 4 days.

Exemplary, non-limiting embodiments of a method of synthesizing a composite material comprising a mixture of at least one metal particle and a carbon material will now be disclosed. The method comprises the steps of:

i. immersing at least one carbon particle that has a porous structure into a solution of metal ions to allow said metal ions to impregnate into the pores of the carbon particle;
ii. drying the impregnated carbon particle; and
iii. subjecting the impregnated carbon particle to a carbothermal reduction process at conditions to thereby synthesize the composite material.

The method may comprise, before the immersing step, the step of forming the carbon particles. The carbon particles may be derived from a biomass material. The biomass material may be converted to the carbon particles by a one-step hydrothermal treatment process. Here, the biomass material may be dissolved in a suitable solvent (such as an aqueous solution) to form a solution of the biomass material. The solution biomass material may be mixed with another solution of a polymeric material. The polymeric material may be a water soluble polymeric material. The polymeric material may be an amphiphilic block copolymer. The polymer material may be selected from the group consisting of Pluronic® F-127 (from Sigma-Aldrich), polyethylene oxide-poly-L-lactic acid (PEO-PLLA), Polyethylene oxide-polycaprolactone (PEO-PCL) and polyethylene oxide-polystyrene (PEO-PS). The polymeric material may be used to control the size of the carbon particle and/or may be used to create pores in the carbon particles.

The solution of biomass material may then be subjected to a temperature in the range of about 180° C. to about 200° C., about 180° C. to about 190° C., or about 190° C. to about 200° C., for a period of time ranging from about 3 to about 12 hours, about 3 to about 5 hours, about 3 to about 7 hours, about 3 to about 9 hours, about 3 to about 11 hours, about 5 to about 12 hours, about 7 to about 12 hours, about 9 to about 12 hours, or about 11 to about 12 hours, to form the carbon particles. The solution of biomass material may be placed in an autoclave and set at the temperature and time period as stated above.

The resultant carbon particles may then be separated from the solution by filtration or centrifugation and then washed with water. The washed carbon particles may then be dried in air or in a vacuum at a suitable temperature. The resultant carbon particles may be easily dispersible in an aqueous solution or in a suitable solvent.

The solution of metal ions is not particularly limited and depends on the type of metal forming the metal particle. It is to be appreciated that a person skilled in the art would know the type of metal salts that can ionise in solution into the respective metal cation and anion.

Hence, the solution of metal ions may be derived from a metal salt. Exemplary types of metal salts may include, but are not limited to, metal nitrate, metal chloride, metal sulfate, metal gluconate, metal citrate or metal oxalate.

The immersing step may be undertaken for a period of time in the range of 30 minutes to 24 hours. In this manner, the metal ions may be uniformly dispersed on or within the carbon particles. As mentioned above, since the carbon material is derived from a biomass material, the resultant carbon material has a layer of saccharides (containing in general hydroxyl and/or carboxylic acid groups) that is able to interact with the metal cation and pull the metal cation towards the carbon particle.

Once the carbon particle is impregnated with the metal ion, the impregnated carbon particle is then subjected to a drying step. The drying step serves to remove the liquid from the carbon particle before the next step. The drying step may be by way of rotary evaporation, freeze drying, air drying or vacuum drying. The drying step may be undertaken at room temperature (of about 25° C. to about 30° C.) or may be undertaken at a suitable drying temperature. To ensure that the carbon particles are sufficiently dried, the carbon particles may be subjected to a further drying step where the carbon particles are subjected to a temperature of about 50° C. to about 80° C., or about 60° C. to about 70° C.

The impregnated carbon material may then be subjected to a carbothermal reduction process at conditions to thereby synthesize the composite material. Here, the metal ions on the impregnated carbon particle may be fixed and deposited on the surfaces of the formed carbon material or be embedded within the carbon material after the carbothermal reduction process. The metal particle may be envisaged as being coated with a thin carbon coating that aids in protecting the metal particle (of zero-valent) from oxidation at ambient conditions.

The subjecting step may be undertaken at a temperature in the range of about 700° C. to about 1000° C., about 700° C. to about 750° C., about 700° C. to about 800° C., about 700° C. to about 850° C., about 700° C. to about 900° C., about 700° C. to about 9500° C., about 750° C. to about 1000° C., about 800° C. to about 1000° C., about 850° C. to about 1000° C., about 900° C. to about 1000° C. or about 950° C. to about 1000° C.

The subjecting step may be undertaken in an inert gas environment, such as in helium, nitrogen or argon.

In the carbothermal reduction process, the carbon particle may act as a reducing agent for the metal ions to form the metal particles (of zero-valent).

The carbothermal reduction process may also include a step of cooling the metal particles on the carbon material. After the carbothermal reduction process, the metal particles may be fixed and deposited on the carbon material.

Exemplary, non-limiting embodiments of a multilayer film will now be disclosed. The multilayer film may comprise (i) an oxygen barrier layer that retards the permeation of oxygen from an external environment into the multilayer film; and (ii) an oxygen scavenging layer comprising a composite material having a mixture of at least one metal particle and a carbon material.

The oxygen barrier layer may be clay/polymer composite to retard the permeation of oxygen from the external environment into the multilayer film.

Other applications of the composite material will be discussed further below.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1

FIG. 1 is a series of Transmission Electron Microscope (TEM) images of (a) C1 particles of Example 1, (b) Fe°/C1 particles of Example 4 and (c) Energy Dispersive X-Ray (EDX) mapping analysis of Fe°/C1 particles.

FIG. 2

FIG. 2 is a series of TEM images of (a) C2 particles of Example 2, (b) Fe'/C2 particles of Example 5 and (c) EDX mapping analysis of Fe°/C2 particles.

FIG. 3

FIG. 3 is a series of TEM images of (a) C3 particles of Example 3, (b) Fe'/C3 particles of Example 6 and (c) EDX mapping analysis of Fe°/C3 particles.

FIG. 4

FIG. 4 demonstrates a X-Ray Diffraction (XRD) pattern of Fe°/C1 particles (a) before and (b) after exposure to air at 100% room humidity (RH) for 24 hours.

FIG. 5

FIG. 5 shows the XRD pattern of (a) Fe°/C1 particles and (b) Fe°/C1 with addition of NaCl after exposure to air at 100% RH for 24 hours.

EXAMPLES

Non-limiting examples of the invention will be further described in greater detail by reference to specific Examples, which should not be construed as in any way limiting the scope of the invention.

Example 1

Preparation of Carbon Particles Derived from α-Cyclodextrin Templated by F-127 Block Copolymers (C1)

22.5 mg of F-127 block copolymers obtained from Sigma Aldrich (of St. Louis, Mo. of the United States of America) was dissolved in 15 ml of deionised water and stirred at room temperature overnight. A total of 45 mg of α-cyclodextrin (TCI-GR, obtained from Tokyo Chemical Industry Co Ltd of Japan) was dissolved in 15 ml of deionised water and stirred at room temperature overnight. The prepared α-Cyclodextrin solution was then injected into the solution of F-127 under stirring at 700 rpm. The F-127 block copolymers functions to control the carbon particle size and 2) create pores in the carbon particle.

The mixed solution was stirred overnight and then transferred into a Teflon-lined stainless-steel autoclave (125 ml in capacity). The autoclave was heated at 200° C. for 6 hours, and then allowed to cool to room temperature. The C1 particles were obtained by centrifugation at 9000 rpm for 30 minutes. The particles were then washed with deionised water for 3 times, by centrifugation at 9000 rpm for 15 minutes each. C1 particles obtained were air dried and then vacuum dried at room temperature for further use.

Example 2

Preparation of Carbon Particles Derived from D-(+)-Glucosamine Hydrochloride (C2)

160 mg of D-(+)-glucosamine hydrochloride (>99%, Sigma Aldrich) was dissolved in 30 ml of deionised water to form a clear solution. Then, the solution was transferred into a Teflon-lined stainless-steel autoclave (125 ml in capacity). The autoclave was heated at 200° C. for 12 hours, and then allowed to cool to room temperature. The C2 particles were obtained by centrifugation at 9000 rpm for 30 minutes. The particles were then washed with deionised water for 3 times, by centrifugation at 9000 rpm for 15 minutes each. C2 particles obtained were air dried and then vacuum dried at room temperature for further use.

Example 3

Preparation of Carbon Particles Derived from D-(+)-Glucose (C3)

3.0-4.5 g of D-(+)-glucose (>99.5%, Tokyo Chemical Industry Co., Ltd, Japan) was dissolved in 30 ml of deionised water to form a clear solution. Then, the solution was transferred into a Teflon-lined stainless-steel autoclave (125 ml in capacity). The autoclave was heated at 180° C. for 3 hours, and then allowed to cool to room temperature. The C3 particles were obtained by centrifugation at 9000 rpm for 30 minutes. The particles were then washed with deionised water for 3 times, by centrifugation at 9000 rpm for 15 minutes each. C3 particles obtained were air dried and then vacuum dried at room temperature for further use.

Example 4

Preparation of Nanostructured Fe°/C1 Particles (Fe°/C1)

0.15 g of C1 particles obtained from Example 1 was dispersed in deionised water. An appropriate amount of iron (III) nitrate nonahydrate (>98%, Sigma Aldrich) (~50 wt % of Fe to carbon) was dissolved in deionised water. Iron (III) nitrate nonahydrate solution was then added into C1 solution, sonicated for 10 minutes and vibrated intermittently for a few hours. The C1 particles were immersed in iron (III) solution overnight. The water was evaporated and dried in the vacuum oven at room temperature. The C1 particles powder collected was then placed in a quartz tube inside a tube furnace and heated to 800° C. with ramp rate of 5° C./min, under argon flow rate of 200 sccm. The sample was kept at 800° C. for 3 hours. After that, the sample was allowed to cool to ambient temperature under argon before removing from the tube furnace. The as synthesized nanostructured Fe°/C1 particles were ready for characterization.

Example 5

Preparation of Nanostructured Fe°/C2 Particles (Fe°/C2)

0.15 g of C2 particles obtained from Example 2 was dispersed in deionised water. An appropriate amount of iron (III) nitrate nonahydrate (>98%, Sigma Aldrich) (~50 wt % of Fe to carbon) was dissolved in deionised water. Iron (III) nitrate nonahydrate solution was then added into C2 solution, sonicated for 10 minutes and vibrated intermittently for a few hours. The C2 particles were immersed in iron (III) solution overnight. The water was evaporated and dried in the vacuum oven at room temperature. The C2 particles powder collected was then placed in a quartz tube inside a tube furnace and heated to 800° C. with ramp rate of 5° C./min, under argon flow rate of 200 sccm. The sample was kept at 800° C. for 3 hours. After that, the sample was allowed to cool to ambient temperature under argon before removing from the tube furnace. The as synthesized nanostructured Fe°/C2 particles were ready for characterization.

Example 6

Preparation of Nanostructured Fe°/C3 Particles (Fe°/C3)

0.15 g of C3 particles obtained from Example 3 was dispersed in deionised water. An appropriate amount of iron (III) nitrate nonahydrate (>98%, Sigma Aldrich) (~50 wt % of Fe to carbon) was dissolved in deionised water. Iron (III) nitrate nonahydrate solution was then added into C3 solution, sonicated for 10 minutes and vibrated intermittently for a few hours. The C3 particles were immersed in iron (III) solution overnight. The water was evaporated and dried in the vacuum oven at room temperature. The C3 particles powder collected was then placed in a quartz tube inside a tube furnace and heated to 800° C. with ramp rate of 5° C./min, under argon flow rate of 200 sccm. The sample was kept at 800° C. for 3 hours. After that, the sample was allowed to cool to ambient temperature under argon before removing from the tube furnace. The as synthesized nanostructured Fe°/C3 particles were ready for characterization.

Test Methods

Transmission Electron Microscope (TEM) and Energy Dispersive X-Ray (EDX)

TEM and EDX analyses were performed with a transmission electron microscope (JEOL 2100 TEM) under an acceleration voltage of 200 kV. All the samples were first dispersed and diluted with ethanol and then dropped on a 200-mesh carbon coated copper grid and dried at room temperature before observation.

FIG. 1(a) and FIG. 1(b) show the TEM images of C1 particles and Fe°/C1 particles respectively while FIG. 1(c) shows the EDX mapping analysis of Fe°/C1 particles. FIG. 2(a) and FIG. 2(b) show the TEM images of C2 particles and Fe°/C2 particles respectively while FIG. 2(c) shows the EDX mapping analysis of Fe°/C2 particles. FIG. 3(a) and FIG. 3(b) show the TEM images of C3 particles and Fe°/C3 particles respectively while FIG. 3(c) shows the EDX mapping analysis of Fe°/C3 particles.

From FIG. 1(a), FIG. 2(a) and FIG. 3(a), it can be seen that the synthesized carbon particles derived from biomass have a particle size ranging from 150 nm to 800 nm, depending on the types of carbon source and its concentrations. The size of carbon particles can be easily fine-tuned by changing the carbon source concentrations. For the C1 carbon particles, the carbon particles are hollow with a size of about 700 nm after the hydrothermal treatment process. The spherical hollow carbon particles were ruptured after the iron impregnation and carbothermal reduction process (FIG. 1(b)). The carbon particle is now present as a porous sheet-like carbon structure. The inventors postulate that the C1 hybrid structure with hydrophilic property was strongly bonded with iron ions during the impregnation process. Such a strong interaction may lead to C1 shrinkage or rupture during the carbothermal reduction process due to the decomposition of the F127.

As for the C2 and C3 carbon particles, spherical carbon particles with a size of about 600 nm and about 250 nm were obtained respectively. The spherical carbon structures (see FIG. 2(b) and FIG. 3(b) respectively) remained stable and unchanged after the surface functionalization processes. The zero-valent iron particles that grew on the carbon supports had an average particle size of less than 500 nm.

The iron particles were uniformly distributed on the carbon supported, as confirmed by the TEM images and EDX mapping analyses (see additionally FIG. 1(c), FIG. 2(c) and FIG. 3(c)). These iron particles strongly interacted with and adhered to the surfaces of the C1, C2 and C3 carbon particles.

X-Ray Diffraction (XRD)

The structure characteristic and crystalline phase of sample was evaluated by XRD analysis. The XRD analysis was performed by using a Bruker D8 General Area Detector Diffraction System (GADDS) XRD using Cukα radiation (k=0.154 nm) with a scanning angle ranging from 20-86°. The sample Fe°/C1 particles were analysed here and the XRD pattern of the tested Fe°/C1 particles at different conditions are shown in FIG. 4 and FIG. 5.

As shown in FIG. 4, iron particles supported on the C1 carbon showed predominantly bode centered cubic α-Fe at 2θ of 44, 65 and 85°, which indicated the formation of zero-valent iron particles (FIG. 4(a)). Similar XRD patterns were obtained for Fe°/C2 and Fe°/C3 (results not shown). It is to be noted that the carbon material stabilized the zero-valent iron from further oxidation, even after exposure to ambient conditions for long hours. The stability of carbon supported iron particles was verified after exposure of the sample to air at 100% relative humidity for 24 hours (see FIG. 4(b)). This is further supported by oxygen scavenging results (see section and Table 1 to 3 below). Negligible oxidation process was observed, as none of the $Fe_2O_3$ or $Fe_3O_4$ peak was detected from the XRD pattern. This criterion is important to ensrue high stability and lifetime of the oxygen scavenger during storage. The Fe°/C products of this application may be easily handled in air since there is no significant reduction of Fe°/C with air at ambient conditions. In contrast, iron particles prepared by chemical reduction process using an excess of reducing agent such as sodium borohydride are easily oxidized and will react with air. This is due to the lack of the protective carbon, leading to the fast oxidization of iron particles made in this manner even when the oxygen is dissolved in water. Once the iron particles are oxidized, the iron particles change from black color to brown color.

As shown by the XRD pattern in FIG. 5, addition of 10 wt % sodium chloride with Fe°/C powder had significantly reacted with oxygen under 100% relative humidity condition, proviing that oxidation process had occurred, forming the $Fe_3O_4$ structure. The XRD peaks of Fe° were diminished, and replaced with $Fe_3O_4$ peaks at 2θ of 30°, 35.5°, 43°, 53.6°, 57.2° and 62.8°. The sodium chloride crystalline phase was also detected from the XRD pattern at 2θ os 31.7° and 45.5°. In this manner, inorganic salts were used as an accelerator to control the absorption rate of oxygen in the scavenging system.

Oxygen Scavenging Analysis Test 25 ml of glass conical flasks were used as sample containers (model packaging) to characterise the $O_2$ scavenging property of the samples. The full capacity of flask initially was filled with air (20.90% $O_2$) at ambient condition. One 2 ml vial containing 1 ml of water was placed inside the flask to adjust the room humidity (RH) to 100%. Approximately 0.03-0.05 g of sample (Fe°/C1, Fe°/C2 and Fe°/C3) with or without sodium chloride (dry or 50 µl solution) was placed inside the flask. Then, the flask was sealed by a gas-tight rubber septum stopper (Suba-Seal, W. Freeman & Co. Ltd, UK) and placed at room temperature for the duration of the oxygen scavenging experiment. The oxygen content in the flask headspace (% $O_2$) was analysed by a headspace oxygen/carbon dioxide analyser (model GS3, Systec Illinois, USA; accuracy to 0.005% $O_2$) in a procedure in which an aliquot of the headspace gas was taken out and analysed using a zirconium-based sensor. A sampling needle with a 0.45 µm PTFE filter was inserted and ~0.875 ml headspace gases were sampled through the stopper. Calibration of headspace analyser was done using ambient air after each sample measurement. Oxygen uptake (mass of oxygen consumed/mass of sample) was calculated indirectly from the decrease in the oxygen content in the headspace of the flasks over time (of about 96 hours).

The oxygen scavenging ability of Fe°/C1, Fe°/C2 and Fe°/C3 are shown in the following Table 1, Table 2 and Table 3 respectively. All the samples were tested in 100% relative humidity. As expected, Fe°/C samples were quite stable with a very slow rate of uptake and low capacity of oxygen absorption at 100% relative humidity. The presence of a trace amount of sodium chloride (about 10 wt % based on the dry weight of Fe°/C), either added as a solid or dissolved in a minimum amount of water (about 30 to 50 µl) had abruptly increased the rate of oxygen uptake. The products had removed most of the oxygen from the model packaging after 4 days, and the highest scavenging rate took place in the first day.

In this regard, it is feasible to control the oxygen scavenging rate and oxygen scavenging capacity in a package (known volume) by monitoring the Fe°/C, sodium chloride and moisture conditions. Moreover, different types of biomass derived carbon particles revealed different oxygen scavenging capabilities. Here, oxygen scavenging capacities in a range of 147 to 208 cm$^3$/g Fe was achieved with the highest oxygen absorption performance at 208 cm$^3$/g Fe. The oxygen scavenging ability of the various iron/carbon particles may depend on the surface areas of the carbon material/particles and the types of saccharide chains that surround the carbon material/particles, which control the dispersion of the iron particles on the carbon supports. Hence, the higher the surface area and/or the greater the amount of saccharide chains, this may lead to an increase in the oxygen scavenging property.

TABLE 1

Oxygen Scavenging Property of Fe°/C1

| Test time (hour) | Oxygen concentration (%) | | |
|---|---|---|---|
| | 50 mg Fe°/C1 | 50 mg Fe°/C1 + 5 mg NaCl | 50 mg Fe°/C1 + 5 mg NaCl + 50 μl H$_2$O |
| 0 | 20.9 | 20.9 | 20.9 |
| 1 | 20.9 | 18.6 | 13.4 |
| 2 | 20.9 | 17.4 | 10.2 |
| 3 | 20.9 | 15.6 | 7.72 |
| 4 | 20.9 | 13.8 | 5.85 |
| 5 | 20.9 | 12.1 | 4.6 |
| 6 | 19.8 | 10.4 | 3.58 |
| 7 | 19.4 | 8.69 | 2.61 |
| 8 | 19.3 | 7.14 | 1.92 |
| 24 | 18.8 | 1.43 | 0.174 |
| 48 | 17.8 | 1.33 | 0.112 |
| 72 | 17.4 | 1.75 | 0.099 |
| 96 | 17.4 | 1.51 | 0.071 |

TABLE 2

Oxygen Scavenging Property of Fe°/C2

| Test time (hour) | Oxygen concentration (%) | | |
|---|---|---|---|
| | 50 mg Fe°/C2 | 50 mg Fe°/C2 + 5 mg NaCl | 50 mg Fe°/C2 + 5 mg NaCl + 50 μl H$_2$O |
| 0 | 20.9 | 20.9 | 20.9 |
| 1 | 20.9 | 16.8 | 8.42 |
| 2 | 20.9 | 14.2 | 5.14 |
| 3 | 20.9 | 11.6 | 3.8 |
| 4 | 20.9 | 9.01 | 3.08 |
| 5 | 20.9 | 6.55 | 1.82 |
| 6 | 20.7 | 4.65 | 1.25 |
| 7 | 20.8 | 3.07 | 1.18 |
| 8 | 20.6 | 1.96 | 1.19 |
| 24 | 20.8 | 1.83 | 1.58 |
| 48 | 19.2 | 1.58 | 1.58 |
| 72 | 19.4 | 1.09 | 1.38 |
| 96 | 19.4 | 1.17 | 1.31 |

TABLE 3

Oxygen Scavenging Property of Fe°/C3

| Test time (hour) | Oxygen concentration (%) | | |
|---|---|---|---|
| | 50 mg Fe°/C1 | 50 mg Fe°/C1 + 5 mg NaCl | 50 mg Fe°/C1 + 5 mg NaCl + 50 μl H$_2$O |
| 0 | 20.9 | 20.9 | 20.9 |
| 1 | 20.9 | 19.4 | 19.4 |
| 2 | 20.9 | 18.6 | 17.8 |
| 3 | 20.9 | 17.2 | 15.6 |
| 4 | 20.2 | 16.4 | 14 |
| 5 | 20 | 15.7 | 12.9 |
| 6 | 19.5 | 15.2 | 12.2 |
| 7 | 19.3 | 14.7 | 11.8 |
| 8 | 19.1 | 14.6 | 11.7 |
| 24 | 19.2 | 14.3 | 11.7 |
| 48 | 19.1 | 14.1 | 11.8 |
| 72 | 19.4 | 14.4 | 12.1 |
| 96 | 19.3 | 14.4 | 12.1 |

INDUSTRIAL APPLICABILITY

The composite material may be used as an oxygen scavenging nanostructured composite. The oxygen scavenging nanostructured composite may be used in food packaging and may be placed in a variety of containers such as sachets, permeable bags, sheet-like mat and laminated sheets to protect the contents of such containers from degradation or reaction with oxygen.

The composite material may be mixed with a polymer and applied onto a plastic film to form a coating layer. The coating layer may be flexible to contour according to a variety of packaged materials and applications. This polymer may be a matrix material such as a hydrogel with controlled release water ability or a high oxygen permeable polymer. It is to be appreciated that the polymer matrix is highly permeable to oxygen molecules, so that the headspace oxygen molecules could freely penetrate through the polymer and for reaction with the nanostructured composite.

The composite material may be applied together with an external oxygen barrier layer to form a multilayer film having (1) an oxygen barrier layer and (2) the composite material as an oxygen scavenging layer as a packaging agent. The oxygen barrier layer could be clay/polymer composites to retard the permeation of oxygen from an external environment to penetrate into the packages. Meanwhile, the headspace oxygen from the packages may be removed by the composite material.

The composite material may be mixed with a biomass derived polymer to form a sheet-like mat via electrospinning method. Such a sheet-like mat oxygen scavenger may be easily fixed or applicable to a variety shape of packages.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A method of synthesizing a composite material comprising at least one metal particle and a carbon material, comprising:
   i. subjecting a dissolved biomass material to a one-step hydrothermal treatment process to form at least one porous carbon particle having a layer of saccharides containing hydroxyl and/or carboxylic acid groups thereon;

ii. immersing said at least one porous carbon particle of operation (i) into a solution of metal ions to allow said metal ions to impregnate into the pores of the carbon particle;
iii. drying the impregnated carbon particle; and
iv. subjecting the impregnated carbon particle to a carbothermal reduction process at conditions to thereby synthesize said composite material, wherein said biomass material is selected from a saccharide wherein the saccharide is selected from a monosaccharide, disaccharide, oligosaccharide or a polysaccharide; wherein the monosaccharide is selected from the group consisting of glucose, fructose and galactose; wherein the oligosaccharide is selected from the group consisting of a sugar or an amino sugar; or wherein the polysaccharide is selected from the group consisting of a cyclodextrin, a cellulose, a glycogen, a chitin and a hemicellulose, and wherein said carbon material is a carbon particle or a sheet-like material having a porous structure with a pore size in the range of 10 to 700 nm.

2. The method of claim 1, wherein the solution of metal ions is derived from a metal salt selected from the group consisting of metal nitrate, metal chloride, metal sulfate, metal gluconate, metal citrate and metal oxalate.

3. The method of claim 1, wherein said immersing step is undertaken for a period of time in the range of 30 minutes to 24 hours.

4. The method of claim 1, wherein said subjecting step is undertaken at a temperature in the range of 700 to 1000° C. or in an inert gas environment.

* * * * *